United States Patent [19]

Rüter

[11] 4,366,270
[45] Dec. 28, 1982

[54] PROCESS FOR UNIFORMLY BLENDING ADDITIVES INTO THERMOPLASTIC SYNTHETIC RESINS

[75] Inventor: Jörn Rüter, Marl, Fed. Rep. of Germany

[73] Assignee: Chemische Werke Hüls A.G., Marl, Fed. Rep. of Germany

[21] Appl. No.: 96,428

[22] Filed: Nov. 21, 1979

Related U.S. Application Data

[63] Continuation-in-part of Ser. No. 881,433, Feb. 27, 1978, abandoned.

[30] Foreign Application Priority Data

Mar. 10, 1977 [DE] Fed. Rep. of Germany ....... 2710379

[51] Int. Cl.³ ............................ C08K 9/04; C08K 9/10
[52] U.S. Cl. ................................. 523/307; 523/351; 523/500; 523/503; 523/504; 523/506; 523/507; 523/508; 523/510; 523/513; 523/526; 524/83; 524/139; 524/141; 524/190; 524/255; 524/256; 524/406; 524/407; 524/601; 524/827
[58] Field of Search ............... 260/37 NP, 37 P; 525/411; 528/357; 523/307, 351, 500, 503, 504, 506, 507, 508, 510, 513, 526; 524/83, 139, 141, 190, 255, 256, 406, 407, 432, 601, 827

[56] References Cited

U.S. PATENT DOCUMENTS

| | | | |
|---|---|---|---|
| 3,021,313 | 2/1962 | Cox et al. | 528/357 |
| 3,299,171 | 1/1967 | Knobloch et al. | 525/411 |
| 3,968,183 | 7/1976 | Hayashi et al. | 525/411 |
| 4,071,507 | 1/1978 | Schoen | 528/357 |

*Primary Examiner*—J. Ziegler
*Attorney, Agent, or Firm*—Wells & Wells

[57] ABSTRACT

A method for the uniform blending of additives into thermoplastic synthetic resins. A solution or finely divided dispersion of the additive is produced in a polymerizable cyclic ester of the general formula:

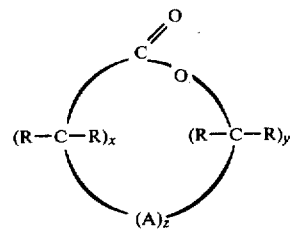

wherein
R represents respectively hydrogen or an alkyl group of 1-18 carbon atoms,
A represents a —O— or —COO— group,
x and y represent integers from 1 to 15, and
z represents 0 or 1.

This solution or dispersion, optionally after polymerization of the cyclic ester, is admixed to the thermoplastic synthetic resin at the end of its manufacturing process or in a subsequent processing stage.

9 Claims, No Drawings

PROCESS FOR UNIFORMLY BLENDING ADDITIVES INTO THERMOPLASTIC SYNTHETIC RESINS

CROSS REFERENCE TO A RELATED APPLICATION

Applicant claims priority under 35 USC 119 for application P No. 27 10 379.3 filed Mar. 10, 1977 in the Patent Office of the Federal Republic of Germany. The present application is a continuation-in-part of application Ser. No. 881,433 filed Feb. 27, 1978 now abandoned.

BACKGROUND OF THE INVENTION

The field of the invention is mixtures of thermoplastic synthetic resins with additives and cyclic esters.

The state of the art of cyclic esters useful in the present invention may be ascertained by reference to U.S. Pat. No. 3,021,313, the disclosure of which is incorporated herein and the state of the art of compounding and processing of thermoplastic synthetic resins may be ascertained by reference to the Kirk-Othmer "Encyclopedia of Chemical Technology", 2nd Edition (1968), vol. 15, pp. 800–807, the disclosures of which are incorporated herein.

As disclosed in Kirk-Othmer, the compounding of plastics may be done on a two-roll mill, an extruder, or a Banbury (Farrel Corp.) mixer. Concentrates or master batches may be produced and blended with virgin resin on a mill before final processing. The rolls on a two-roll mill operate at different speeds and temperatures. In spite of the simplicity of the milling operation, extrusion is usually preferred since an extruder can operate continuously to produce strands that may be cut by a rotating knife to produce uniform pellets.

A conventional process for the introduction of additives into thermoplastic synthetic resins resides in that the additives are added in a pug mill to the finished polymers or polycondensates and mixed in the melt, for example in an extruder. Apart from the fact that this operation represents an additional working step, this method of incorporation is unsuitable for distributing finely divided additives uniformly in the synthetic resin. This holds true, in particular, if minor amounts of optical brighteners, stabilizers, flatting agents, or similar materials are to be homogeneously distributed in a synthetic resin.

It is furthermore known to disperse the additive in one of the starting materials required for the production of the synthetic resin, for example in ethylene glycol [starting compound for poly(ethylene terephthalate)], and to add this dispersion during the manufacture of the polymer. The primary disadvantage in this process is that the additive can decompose under the relatively vigorous reaction conditions which almost always are ambient in the manufacture of synthetic resins, triggering discolorations and degradation reactions. Besides, an agglomeration of the additive occurs frequently under the reaction conditions, leading to an inhomogeneous distribution of the additive in the synthetic resin.

The danger of thermal degradation of the additive can be reduced by utilizing a premix wherein the additive is dispersed in a concentrate (masterbatch), corresponding to the actual synthetic resin or compatible with the latter. This premix is generally added at the end of the synthetic resin manufacturing process. Such suggestions disregard the fact that the same above-mentioned problems can occur during the preparation of the premixes.

Although the agglomeration of the additive in the monomer dispersions can be diminished by auxiliary dispersing agents which are to maintain the dispersion in stable condition even under the manufacturing conditions of the synthetic resin, these auxiliary agents, apart from the expense of obtaining them, can impair the properties of the synthetic resin in an undesirable manner.

SUMMARY OF THE INVENTION

Having in mind the limitations of the prior art, it is an object of the present invention to develop an improved process for the incorporation of additives into thermoplastic synthetic resins.

This object is achieved in a process wherein a solution or finely divided dispersion of the additive is produced in a polymerizable cyclic ester of the general formula:

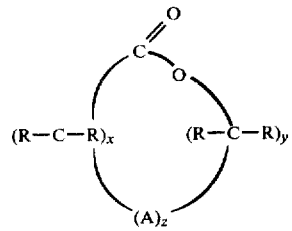

wherein
R represents respectively hydrogen or an alkyl group of 1–18 carbon atoms,
A represents a —O— or —COO— group,
x and y represent integers from 1 to 15, and
z represents 0 or 1.

This solution or dispersion, optionally after polymerization of the cyclic ester, is admixed to the thermoplastic synthetic resin at the end of its manufacturing process or in a subsequent processing stage.

When $z=0$, the preferred value of $x+y=2$ or $\geq 4$, since 5-ring lactones, which are not among the preferred cyclic esters, are very difficult to polymerize and when $z=1$, $y \geq 2$ is preferred.

The concentration of the additives is 1 to 50% by weight of total additives and cyclic esters and preferably 10 to 30%. The cyclic esters are polymerized with the additives dispersed therein at a temperature of about 120° to 350° C., preferably 150° to 280° C., for 180 to 5 minutes and preferably 100 to 10 minutes to obtain an intermediate product. The intermediate product polymerized cyclic esters and additives having an additive concentration of 0.001 to 15% by weight of total additives, esters and thermoplastic synthetic resins and preferably an additive concentration of 0.01 to 5%, are admixed with the thermoplastic synthetic resins in a molten state at a temperature of about 150° to 350° C. for 1 to 30 minutes.

In the case where the dispersion of cyclic esters and additives is not polymerized before admixing with the thermoplastic synthetic resins, the polymerization of the cyclic esters takes place during admixing of the additives, cyclic esters and thermoplastic synthetic resins. The concentration of the additives dispersed in cyclic esters is 1 to 50% by weight of total additives and cyclic esters and preferably 10 to 30%. The dispersion is admixed with the thermoplastic synthetic resins in a molten state at a temperature of about 120° to 350° C. The concentration of additives is 0.001 to 15% by weight, and preferably 0.05 to 5%, based on the total weight of additives, cyclic esters and thermoplastic synthetic resins. In order to polymerize the cyclic esters, the temperature of the admixture is maintained at 120° to 350° C., and preferably 150° to 280° C., for 180 to 5 minutes and preferably 100 to 10 minutes.

DESCRIPTION OF THE PREFERRED EMBODIMENTS

The process of the present invention is suitable for all customary additives for thermoplastic synthetic resins, such as inorganic or organic pigments, dyes, UV stabilizers, hydrolysis stabilizers, and thermostabilizers, optical brighteners, flatting agents and crystallization accelerators. The process of the present invention is especially advantageous if it is intended to distribute small amounts of an additive, such as, for example, optical brighteners, stabilizers, flatting agents, or crystallization accelerators, homogeneously in a synthetic resin.

The process of the present invention is applicable to all conventional thermoplastic synthetic resins, such as polyolefins, polystyrene, polyvinyl chloride, polyamides, polyesters, polyacrylates, polyurethanes.

Particular fields of usage are linear, high-molecular polyesters, such as poly(ethylene terephthalate), poly(butylene terephthalate), poly(1,4-cyclohexylenedimethylene terephthalate). The process of this invention is particularly advantageous for the homogeneous introduction of small amounts of additives, such as optical brighteners, stabilizers, or flatting agents into linear, high-molecular polyesters intended for fiber manufacture.

Consequently, all polymerizable cyclic esters are basically suitable for the claimed process. Preferably, the cyclic esters which are liquid at room temperature are employed, since these can be processed most readily in the usual dispersing apparatus, such as ball mills, PERL-MILLS ® three roller mills, and others, for the preparation of homogeneous dispersions. In particular, lactones are suitable such as β-propiolactone, α,α-dimethyl-β-propiolactone, δ-valerolactone, ε-caprolactone, heptan-7-olide, decan-10-olide, dodecan-12-olide, tetradecan-14-olide, pentadecan-15-olide, oxalactones, such as 2-oxo-1,4-dioxane, 4-oxahexan-6-olide, 8-oxadecan-10-olide, 12-oxatetradecan-14-olide, 12-oxahexadecan-16-olide, as well as cyclic condensation products of aliphatic dicarboxylic acids and aliphatic diols, such as, for example, 1,4-dioxacyclodecane-5,10-dione, 1,4-dioxacyclotridecane-5,13-dione, 1,6-dioxacyclopentadecane-7,15-dione, 1,4-dioxacyclotetradecane-5,14-dione, 1,6-dioxacyclohexadecane-7,16-dione, and 1,4-dioxacyclohexadecane-5,16-dione.

According to the invention, the desired additive is dissolved or finely dispersed in a cyclic ester. The concentration selected is dependent on the type of additives and on the desired final concentration in the synthetic resin; the concentration should be at a maximum in order to keep the consumption of cyclic ester and simultaneously the degree of modification of the synthetic resin at a minimum. Customarily, concentrations are employed between 1 and 50% by weight, preferably between 5 and 40% by weight, especially between 10 and 30% by weight.

The cyclic ester containing the desired additive in dissolved or dispersed form can be directly added to the synthetic resin, which latter is suitably in the molten state; however, it is also possible to previously polymerize the cyclic ester with the additive contained therein.

The method of direct addition is chosen if the additive forms a solution or a stable dispersion in the cyclic ester, and if the polymerizability of the cyclic ester and the intermixing conditions are such that a polymerization of the cyclic ester will definitely take place during the mixing of the solution or dispersion into the molten synthetic resin. In other words, the cyclic ester must possess, optionally with the aid of suitable polymerization catalysts, such a high polymerization tendency that it will soon polymerize under the mixing conditions. Therefore, the solution or dispersion is best admixed to the melt of the synthetic resin under agitation after the synthetic resin has been produced. For this purpose, temperatures are suitable of 120°-350° C., especially 200°-300° C., if readily polymerizable cyclic esters are utilized, such as, for example, ε-caprolactone, γ-valerolactone, or 1,4-dioxacyclohexadecane-5,16-dione.

Suitable polymerization catalysts can be the catalyst systems described in U.S. Pat. No. 3,021,313, as well as in J. Macromol. Sci. Chem. A 6, 1 109 (1972), namely aluminum alcoholates, such as aluminum methylate, aluminum ethylate, aluminum isopropylate, aluminum tert.-butylate, or other organometallic compounds, such as diethylzinc, dibutylzinc, dimethylcadmium, methylmagnesium bromide, butyllithium, triethylaluminum, methylzinc chloride, tin dialcoholates and tetraalcoholates, such as tin diethylate, tin dibutylate, tin tetraethylate, tin tetrabutylate, titanates, such as titanium tetraisopropylate or titanium tetrabutylate, etc. It is also possible to utilize combinations of these catalysts with compounds with active hydrogen, such as polyols, polyamines, carboxylic acids, etc. Also suitable are tin salts, such as tin(II) chloride, tin(II) acetate, tin(II) laurate, tin(II) stearate, lead salts, such as lead stearate, tertiary amines, such as triethylamine, tributylamine, tertiary phosphines, such as triethylphosphine, tributylphosphine, triphenylphosphine, quaternary ammonium compounds, such as tetraalkyl ammonium salts of carboxylic acids, sulfonium salts, such as trimethylsulfonium iodide or triethylsulfonium iodide, optionally in combination with monovalent alcohols or unsaturated or aromatic halogenated hydrocarbons to regulate the molecular weight.

These catalysts, which are suitably dissolved first of all in the cyclic ester, are utilized in amounts of 0.001 to 3% by weight, especially 0.05-1% by weight, based on the cyclic ester.

In contrast thereto, in many cases the cyclic ester, which contains the additive, will first be polymerized and only then admixed to the synthetic resin. This is recommended, for example, if the dispersion of the additive in the cyclic ester shows inadequate stability so that the fixation of the dispersion in a polymer concentrate is more advantageous. In this connection, the polymerization is to be conducted to such a stage that a material is produced having sufficient viscosity for extrusion granulation, pelletizing, or similar comminution methods used for polymers. Thereby a concentrate of the additive in the form of a masterbatch is obtained. The criteria indicated for the incorporation into the synthetic resin by polymerization also apply to the polymerization of the cyclic ester: The polymerization can be effected in a purely thermal manner, but also with the aid of the aforementioned catalysts.

The thus-formed concentrate is added to the synthetic resin at the end of the manufacturing process thereof, suitably directly after the polymerization or polycondensation while still in the molten state. However, it is also possible to admix the concentrate to the synthetic resin subsequently during one of the following processing stages, for example in an extruder. This can take place by way of special mixing extruders with metering screws. It is, of course, likewise possible to intermix the concentrate with the granulated polymer and to process the granulated mixture in a conventional extruder.

In any event, a homogeneous distribution of the additive in the polymer is achieved without the danger of a thermal degradation or an agglomeration of the additive. Besides, a disturbing influence of the originally monomeric solvent or dispersing agent on the properties of the polymer is avoided by the polymerization of the cyclic ester.

Specific examples of useful additives include, but are not limited to $TiO_2$, white lead, white zinc, lampblack, cadmium yellow, ultramarine pigments, molybdate red, chromium oxide pigments, iron oxide pigments, guinacribone series pigment dyestuffs, complex pigment dyestuffs and azo dyestuffs.

Stabilizers useful in the present invention include but are not limited to organic phosphites, such as tri-n-dodecylphosphite; organic phosphates, such as triphenylphosphate; Cu salts, such as CuI; phenols, such as IONOL ® (Shell), ANTIOXIDANT ® 2246 (Cyanamide), TOPANOL ®CA (ICI), IRGANOX 1010, and IRGANOX 1098 (Ciba-Geigy); benzotriazol compounds, such as TINUVIN ® 326, TINUVIN P (Ciba-Geigy); benzophenone stabilizers, such as CYASORB- ®UV 2018 (Cyanamide), UVINOL ®M 40, UVINOL 490 (Antara Chemicals); amines, such as N,N-diphenyl- and N,N-di-2-naphthyl-p-phenylene-diamine, TINUVIN 770 (Ciba-Geigy).

The optical brighteners useful in the present invention include complex stilbene- and benzotriazol derivatives and these compounds are disclosed in German Pat. Nos. 752,677; 955,683, 966,411 and U.S. Pat. No. 2,600,080.

Specific examples of the overall combination of thermoplastic synthetic resin/additive/cyclic ester useful in the present invention include, but are not limited to:
polyethylene terephthalate/$TiO_2$/1,4-dioxyacyclohexadecane-5,16-dione;
polyethylene terephthalate/$TiO_2$/gamma-valerolactone;
polyethylene terephthalate/$TiO_2$/epsilon-caprolactone;
polyethylene terephthalate/stilbene optical brightener/1,4-dioxyacyclohexadecane-5,16-dione;
polyethylene terephthalate/stilbene optical brightener/epsilon-caprolactone; polypropylene/$TiO_2$/1,4-dioxyacyclohexadecane-5,16-dione;
polyethylene/$TiO_2$/1,4-dioxyacyclohexadecane-5,16-dione;
polystyrene/$TiO_2$/1,4-dioxacyclohexadecane-5,16-dione;
polyamide 6/$TiO_2$/1,4-dioxacyclohexadecane-5,16-dione;
polyamide 6-6/$TiO_2$-1,4-dioxacyclohexadecane-5,16-dione;
polyamide 12/$TiO_2$/1,4-dioxacyclohexadecane-5,16-dione;
polyamide 6-12/$TiO_2$/1,4-dioxacyclohexadecane-5,16-dione;
polybutyleneterephthalate/$TiO_2$/1,4-dioxacyclohexadecane-5-16-dione;
polyethylene terephthalate/IRGANOX 1093/1,4-dioxacyclohexadecane-5,16-dione.

EXAMPLE 1

(Preparation of the Concentrate)

30 g. of $TiO_2$ is dispersed in a PERL-MILL ® in 70 g. of 1,4-dioxacyclohexadecane-5,16-dione. After adding 0.4 g. of aluminum isopropylate, the dispersion is polymerized under nitrogen for 60 minutes at 150° C. while agitating, thus obtaining a viscous, white melt which is extruded into a rod and processed into cylindrical granules (length 1-2 mm.). In this way, a $TiO_2$ concentrate is obtained, the polyester proportion of which has an RSV value of 0.73 dl./g. (measured in a 0.23% solution in phenol/tetrachloroethane 60:40 at 25° C.).

EXAMPLE 2

33 g. of the concentrate produced in Example 1 is mixed in granulated form with 2 kg. of a poly(ethylene terephthalate), granulated, having an RSV value of 0.60 dl./g. The mixture is spun in a melt spinning apparatus into threads which are drawn in the hot state in a single operating step. The thus-drawn threads are pigmented completely homogeneously in white. To confirm the homogeneous distribution of the $TiO_2$, ten samples of the thread are examined analytically, with the finding that the $TiO_2$ content of all samples is in the range from 0.485 to 0.505%. The same favorable results are obtained by using γ-valerolactone instead of 1,4-dioxacyclohexadecane-5,16-dione for producing the concentrate according to Example 1.

EXAMPLE 3

In a 4-liter polycondensation reactor, poly(ethylene terephthalate) is produced in accordance with the usual two-stage method (transesterification—polycondensation) under a pressure of <0.5 mbar, a temperature of 280° C., and a polycondensation period of 1½ hours from 2.02 kg. terephthalic acid dimethyl ester
1.29 kg. ethylene glycol
2.02 g. Ca acetate (transesterification catalyst) and
1.01 g. $Sb_2O_3$ (polycondensation catalyst)+
2.02 g. $(PhO)_3PO$ (stabilizer).

After termination of the polycondensation, 33 g of the $TiO_2$ concentrate prepared in accordance with Example 1 is introduced into the reactor via a heated vacuum charging valve. After 5 minutes of agitation, the mixing is stopped and the poly(ethylene terephthalate) is discharged under extrusion into granules. The polyester shows a pure white and has an RSV value of 0.63 dl./g. The $TiO_2$ content of various samples of the granulated material fluctuates, as in Example 2, merely within the measuring accuracy of the Ti determination method.

A like homogeneous distribution of the pigment is obtained by using ε-caprolactone instead of 1,4-dioxacyclohexadecane-5,16-dione for the preparation of the concentrate (Example 1).

EXAMPLE 4

30 g. of a commercial, optical brightener on the basis of stilbene is dispersed in a PERL-MILL ® in 70 g. of 1,4-dioxacyclohexadecane-5,16-dione; the dispersion is combined in an agitated vessel under nitrogen with 0.4 g. of aluminum isopropylate and polymerized for 60 minutes at 150° C. The highly viscous melt can be pressed into a rod and granulated. The polyester proportion of the concentrate has an RSV value of 0.69 dl./g.

1.2 g. of this concentrate is fed analogously to Example 3 to a poly(ethylene terephthalate) batch after termination of the polycondensation via a heated vacuum charging gate. After 5 minutes of agitation, the mixing is terminated, the optically brightened polyester is discharged, and granulated: RSV value 0.67 dl./g. The granulated material can be spun in a melt spinning apparatus into threads which are drawn in the hot state in a single operating step (individual titer 4 dtex). When viewing the threads under UV light, it is found that each individual capillary has been uniformly optically brightened.

EXAMPLE 5

24 g. of the brightening concentrate produced in Example 4 (brightening agent concentration 30%) is added analogously to Example 3 to a poly(ethylene terephthalate) batch after termination of the polycondensation by way of a heated vacuum charging valve. After 5 minutes of agitation, the polycondensation is terminated, the polyester is discharged and granulated. The polyester, which has a reddish color, exhibits an RSV value of 0.64 (dl./g), and its content of optical brightener is 0.4%. This granulated material is mixed with 20 times the amount of poly(ethylene terephthalate) granules, RSV value 0.60 (dl./g.) and this mixture is spun in a melt spinning apparatus into threads which are drawn in the hot state in a single stage (individual titer 4 dtex). When viewing the threads under UV light, it is found that each individual capillary has been uniformly brightened optically.

The same favorable results as in Examples 4 and 5 are obtained by using ε-caprolactone instead of 1,4-dioxacyclohexadecane-5,16-dione for the preparation of the concentrate (Example 4).

EXAMPLE 6

33 g. of the concentrate produced in Example 1 is mixed with 2 kg. of the commercial polymers compiled in the table. The mixture is spun in a melt spinning apparatus into threads, utilizing the temperatures listed in the table (bulk temperature in the spinning head).

The homogeneous distribution of the $TiO_2$ can be confirmed purely visually as well as by determining the titanium content of 10 different samples.

TABLE

| Polymer | Bulk Temperature (°C.) |
|---|---|
| Polypropylene | 250 |
| Polyethylene | 240 |
| Polystyrene | 240 |
| Polyamide 6 | 270 |
| Polyamide 6.6 | 300 |
| Polyamide 12 | 260 |
| Polyamide 6.12 | 280 |
| Poly(butylene terephthalate) | 270 |

EXAMPLE 7

10 g. of a commercially available stabilizer ("IRGANOX" 1093 of Ciba Geigy AG) is dissolved under gentle heating in 90 g. of 1,4-dioxacyclohexadecane-5,16-dione, and the solution is mixed in a mixer with 2 kg. of poly(ethylene terephthalate), RSV value 0.60 (dl./g.). The mixture is spun in a melt spinning apparatus into threads and the latter are drawn in a single stage. By the elemental analysis (phosphorus) of 20 different threads, it is determined that the stabilizer is distributed homogeneously in the polyester. By extracting the threads with methanol (solvent for 1,4-dioxacyclohexadecane-5,16-dione), one can prove that the cyclic ester after spinning is no longer present as such, but rather is anchored in the poly(ethylene terephthalate) by polymerization. Only traces of 1,4-dioxacyclohexadecane-5,16-dione can be detected in the extract.

EXAMPLE 8

The concentrate from Example 7 is polymerized as follows:

10 g of a commercial stabilizer (IRGANOX ® 1093, Ciba-Geigy) are dissolved in 90 g of 1,4-dioxacyclohexadecane-5,16-dione and the solution is reacted in a mixing vessel under nitrogen with 0.5 g of Al-isopropylate and polymerized at 150° C. for 60 minutes. The highly viscous melt is pressed into a strand and is granulated. The polyester proportion of the concentrate has an RSV value of 0.61 dl/g.

EXAMPLE 9

The concentrate-granule prepared in Example 8 is mixed with 2 kg of a poly(ethyleneterephthalate) with an RSV value of 0.60 dl/g and the mixture is spun into yarns in a melt-spinning equipment (bulk temperature between 280° and 250° C.) and stretched in a single stage. The stabilizer is homogeneously distributed in the yarns.

COMPARISON EXAMPLE 10

2.02 kg of terephthalic acid dimethylester are transesterified with 1.29 kg of ethyleneglycol in the presence of 2.02 g of Ca-acetate in a 4-liter polycondensation vessel. Following the end of methanol splitting, the mixture is reacted with 100 g of the concentrate prepared in Example 8, i.e., 1.01 g of $Sb_2O_3$, and 2.02 g of triphenylphosphate. The mixture is polycondensed for 2½ hours at 280° C. and a pressure less than 0.5 mbars and then granulated into a strand. The granulate obtained is spun into yarns and stretched in a single stage in melt-spinning equipment (bulk temperature is 280°–290° C.) as in Examples 7 and 9.

COMPARATIVE EXAMPLE 11

The Comparison Example 10 is repeated except that a solution of 10 g of IRGANOX 1093 is used in 90 g of 1,4-dioxacyclohexadecane-1,16-dione (similar to Example 7) after the transesterification phase in lieu of the concentrate indicated in Example 8.

| DSC ANALYSES OF SPUN YARNS | | |
|---|---|---|
| | $Tm_1$ | $Tm_2$ |
| Example 7 | 78 | 252 |
| Example 9 | 78 | 252 |
| Comparison Example 10 | — | 242 |
| Comparison Example 11 | — | 241 |

DSC means Differential Scanning Calorimetry and allows the accurate measurement of glass transition temperatures and melting points in crystallites; Tm is the particular melting temperature.

Examples 7 and 9 and Comparison Examples 10 and 11 show that the addition of the cyclic ester or of the polymerized cyclic ester during the preparation of the poly(ethyleneterephthalate)—following the transesterification—leads to statistical copolymers comprising only one clearly depressed melting point (Tm) with respect to pure poly(ethyleneterephthalate) [DSC analysis], whereas the mixtures (Examples 7 and 9) evidence two separate melting peaks [$Tm_1$ poly(ethylenedodecanedioate) and $Tm_2$ poly(ethyleneterephthalate)].

I claim:

1. In a process for the uniform blending of additives into thermoplastic synthetic resins after said thermoplastic synthetic resins have been produced, the improvement comprising dispersing said additives in polymerizable cyclic esters of the general formula:

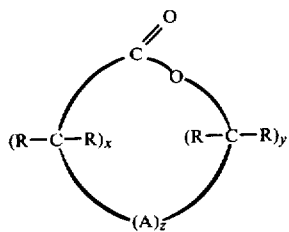

wherein
R represents respectively hydrogen or an alkyl group having 1-18 carbon atoms,
A represents —O— or —COO— group,
x and y represent integers from 1 to 15,
z represents 0 or 1, and the concentration of said additives is 1 to 50% by weight of said additives and said cyclic esters,
polymerizing said cyclic esters with said additives dispersed therein at a temperature of about 120° to 350° C. for 5 to 180 minutes to obtain an intermediate product; and
admixing said intermediate product of polymerized cyclic esters and additives having an additive concentration of 0.001 to 15% by weight of said additives, said cyclic esters and said thermoplastic synthetic resins with said thermoplastic synthetic resins in a molten state at a temperature of about 150° to 350° C. for 1 to 30 minutes.

2. The process of claim 1, wherein the concentration of said additives in said dispersion is 10 to 30% by weight, the concentration of said additives in said admixture is 0.01 to 5% by weight, the temperature of polymerization is 150° to 280° C. and the polymerization is carried out for about 10 to 100 minutes.

3. The process of claim 2, wherein said thermoplastic synthetic resins are linear, high-molecular polyesters.

4. The process of claim 2, wherein said additives are selected from the group consisting of pigments, optical brighteners, and stabilizers.

5. The process of claim 1, wherein when $z=0$, $$x+y=2 \text{ or } \geq 4,$$

and when $z=1$, $y \geq 2$.

6. The process of claim 3, wherein said cyclic esters are epsilon-caprolactone or 1,4-dioxacyclo-hexadecane-5,16-dione.

7. The process of claim 4, wherein said additives are pigments.

8. The process of claim 4, wherein said additives are optical brighteners.

9. The process of claim 4, wherein said additives are stabilizers.